(12) United States Patent
Mauthe et al.

(10) Patent No.: US 6,805,033 B2
(45) Date of Patent: Oct. 19, 2004

(54) SEATING UNIT IN A COMBAT VEHICLE THAT IS PROTECTED AGAINST MINES

(75) Inventors: Thomas Mauthe, Landsberg/Lech (DE); Gerhard Heise, München (DE); Adolf Egger, Dachau (DE); Hans Hesse, München (DE)

(73) Assignee: Krauss-Maffei Wegmann GmbH & Co. KG (DE)

( * ) Notice: Subject to any disclaimer, the term of this patent is extended or adjusted under 35 U.S.C. 154(b) by 0 days.

(21) Appl. No.: 10/243,527

(22) Filed: Sep. 13, 2002

(65) Prior Publication Data

US 2003/0051598 A1 Mar. 20, 2003

(30) Foreign Application Priority Data

Sep. 14, 2001 (DE) .......................................... 101 45 315

(51) Int. Cl.[7] ................................................. F41H 5/00
(52) U.S. Cl. ...................... 89/36.01; 89/36.11; 89/36.13
(58) Field of Search ......................... 89/36.01, 36.11, 89/36.13; 297/216.1, 216.13; 244/122 R (56) References Cited

U.S. PATENT DOCUMENTS

| | | | |
|---|---|---|---|
| 2,032,300 A | * 2/1936 | Murray et al. .............. | 89/37.16 |
| 2,254,678 A | * 9/1941 | Frise .......................... | 89/37.16 |
| 2,280,804 A | * 4/1942 | Seversky .................... | 89/37.16 |
| 2,370,896 A | * 3/1945 | Weaver ...................... | 89/37.16 |
| 2,389,852 A | * 11/1945 | Hagner ....................... | 89/41.19 |
| 3,532,379 A | * 10/1970 | Mason et al. ........... | 297/216.17 |
| 3,581,620 A | * 6/1971 | Hauck et al. .............. | 89/36.11 |
| 3,710,682 A | * 1/1973 | Hansen et al. ............. | 89/36.11 |
| 3,954,041 A | * 5/1976 | Mechulam et al. ........ | 89/36.13 |
| 4,003,534 A | * 1/1977 | Kenigsberg et al. ..... | 244/122 R |
| 4,144,797 A | * 3/1979 | Berge et al. ............... | 89/36.13 |
| 4,159,669 A | * 7/1979 | Jackson et al. | |
| 4,523,730 A | * 6/1985 | Martin .................... | 244/122 R |
| 5,791,597 A | * 8/1998 | Knoll ...................... | 244/122 R |
| 6,378,939 B1 | * 4/2002 | Knoll et al. ............. | 297/216.1 |

FOREIGN PATENT DOCUMENTS

| | | | | |
|---|---|---|---|---|
| DE | 196 33 031 | * | 2/1997 | ................ 89/36.01 |
| DE | 19625715 | | 10/1997 | |
| DE | 19702398 | | 7/1998 | |
| DE | 19717782 | | 2/2001 | |

* cited by examiner

*Primary Examiner*—Michael J. Carone
*Assistant Examiner*—L. Semunegus
(74) *Attorney, Agent, or Firm*—R W Becker & Associates; Robert W. Becker (57) ABSTRACT

A seating unit in a combat vehicle that is protected against mines is provided. The vehicle has a hull that is disposed on the chassis and that has at least one hatch in its roof plate that can be closed off by a hatch cover. The seating unit, which is disposed in the hull in the region below the hatch, is provided with a base on which is disposed a seat and that is suspended on the front or side wall and/or the roof plate of the hull via a tubular construction in such a way that the base is not at less than a prescribed spacing relative to the base of the hull. The tubular construction can comprise two guide tubes that extend parallel to one another and upwardly at an angle. The upper ends of the tubes are connected with the front wall, and the lower ends are suspended on the roof plate via connecting tubes. The base is displaceably disposed on the guide tubes via holding devices. A drive mechanism for moving the base back and forth enables displacement of the seat into a raised position directly below the hatch opening.

8 Claims, 7 Drawing Sheets

SEATING UNIT IN A COMBAT VEHICLE THAT IS PROTECTED AGAINST MINES

BACKGROUND OF THE INVENTION

The present invention relates to a seating unit in a combat vehicle that is protected against mines.

With known seating units for combat vehicles, the base of the seating unit that carries the seat is generally secured to the base of the vehicle via a lifting mechanism. The adjustment of the height of the seat is effected via devices that are provided with a counter balance, a swivel arm, or a parallelogram guidance. Thus, for example, DE 197 17 782 C2 describes a seating unit in a combat vehicle where the base, which is disposed below a hatch in the vehicle hull, is embodied as an essentially right-angled seat-carrying frame that is disposed horizontally and essentially in the longitudinal direction of the vehicle, and at its rear corner, which faces the longitudinal central axis of the vehicle, is coupled via a holding means with a guide column that is vertically and fixedly disposed in the vehicle. In the state where it is occupied by a crew member, the seat-carrying frame can be raised out of a lower position into a raised position, and again lowered into the lower position, along the guide column via a lifting mechanism. The lower end of the guide column is secured to the base of the vehicle hull. This securement of the elements that carry the seat on the base of the vehicle hull has been shown to be a serious drawback during the explosion of mines. Even where the underside of the combat vehicle is provided with protection against mines, it has been shown that when a mine explodes the base of the vehicle hull bulges significantly upwardly, and all of the components that are fixedly connected to the base participate in the shock load that occurs, so that a very great pulse is conveyed to the vehicle's seat and hence to the person sitting thereon, which can lead to considerable injuries.

It is therefore an object of the present invention to provide a seating unit in a combat vehicle that is protected against mines, according to which the shock load that during an explosion of a mine acts upon the base of the vehicle hull is not transferred to the seat.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

To realize the aforementioned object, the present invention provides a seating unit in a combat vehicle that is protected against mines and has a vehicle hull disposed on a chassis, wherein the hull has a roof plate that is provided with at least one hatch that can be closed off by a hatch cover; the seating unit, which is disposed in the vehicle hull in the region below the hatch, is provided with a base on which is disposed a seat, and on which is pivotably secured a back rest, whereby the base is suspended on the front or the rear wall and/or on the roof plate of the vehicle hull via a tubular construction in such a way that the base is not at less than a prescribed spacing relative to the base of the vehicle hull.

The basic concept of the present invention is that the connection of the seating unit to the vehicle hull is not undertaken in the region of the base of the hull; rather, the seating unit is to be located in the region of the front wall, the side walls and/or the roof plate, i.e. at locations where the pulse of the mine explosion is greatly dampened and the deformations of the vehicle structure have a value of nearly zero.

Pursuant to one particularly advantageous specific embodiment of the inventive seating unit, the aforementioned tubular construction comprises at least two guide tubes, which extend parallel to one another and upwardly at an angle relative to the plane of the base of the vehicle hull, wherein upper ends of the guide tubes are secured in the upper region of the front or side walls of the vehicle hull, and lower ends of the guide tubes are suspended on the roof plate of the vehicle hull via connecting tubes, whereby the base is displaceably arranged on the guide tubes via holding means, and a drive mechanism is provided for the back and forth movement of the base along the guide tubes.

As a consequence of the fact that the guide tubes extend upwardly at an angle, these tubes serve simultaneously for the suspension and the guidance of the base of the seating unit and for the adjustment of the height of the seat. In this connection, the base that carries the seat can on the one hand be displaced upon the guide tubes in such a way that always the correct seating position relative to the operating elements and viewing means while traveling can be adjusted under the hatch, and on the other hand the base can be raised in the region directly below the hatch opening so that in this raised position it is possible to observe out of the open hatch from the seating unit. In the event of danger, a rapid lowering can be provided that returns the base and seat to the lowermost position.

The inventive seating unit represents a simple and economical solution that is suitable not only for the new construction of combat vehicles that are protected against mines, but also for a retrofitting of such combat vehicles, and in particular is contemplated for the equipping of driver positions, in the combat vehicle, that are protected against mines.

Further specific features of the present invention will be described in detail subsequently.

DESCRIPTION OF PREFERRED EMBODIMENTS

Figure 1:
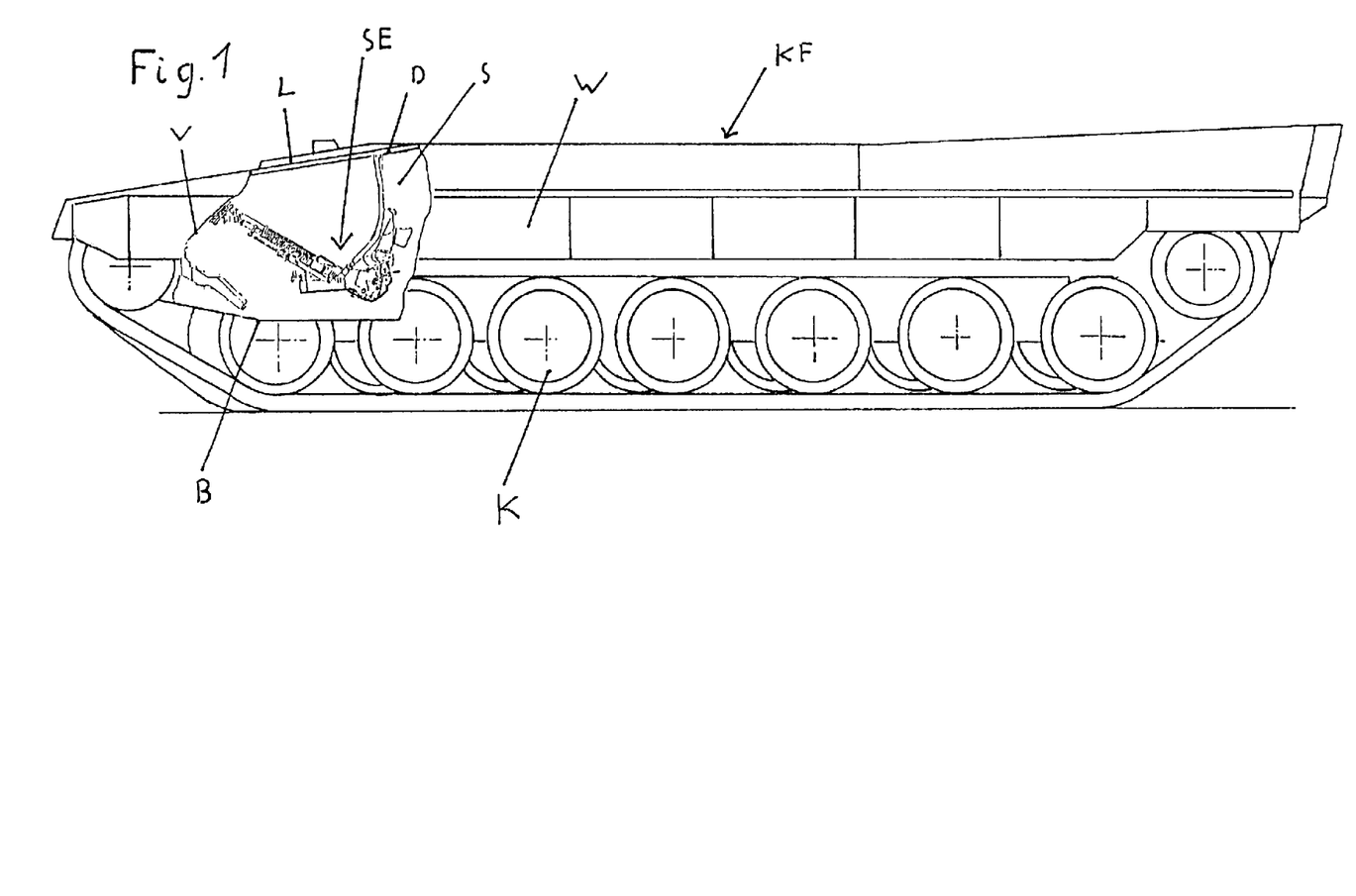
FIG. 1 is a partially broken-away side view of a combat vehicle that is protected against mines and that has an indicated seating unit.

Referring now to the drawings in detail, FIG. 1 shows a combat vehicle that is designated in general by the reference symbol KF, and which is provided with a vehicle hull W that is carried by a chassis that is provided with a chain propelling mechanism K. As can be recognized from the broken-away illustration at the front portion of the combat vehicle KF, disposed in the combat vehicle is a seating unit for the driver of the vehicle; the seating unit is designated in general in FIG. 1 by the reference symbol SE. As can be furthermore recognized from FIG. 1, the seating unit SE is disposed below the roof plate D, whereby such roof plate is provided with at least one hatch L that can be closed off by a hatch cover. Furthermore, from the interior of the vehicle, in the region of the seating unit SE, one can recognize a front wall V, a side wall S, and a base plate B.

A first exemplary embodiment of the inventive seating unit SE for the driver's seat will be described subsequently with the aid of FIG. 2. In particular, from FIG. 2 one can see a portion of the base plate B of the vehicle hull W, as well as portions of one side wall S, a front wall V and a roof plate D. Disposed in the region of the base plate B are torsion-bar springs F that in a conventional manner extend in the transverse direction relative to the combat vehicle.

The seating unit is provided with a base 1, which is embodied as a deformation-resistant, splinter proof sheet-metal structure having a base wall 1.2 and two closed side walls 1.3. The base 1 carries a seat 2 to which, in a conventional and known manner, a backrest 2.1 is secured in a pivotable and possibly removable manner. This base 1 is not supported and secured upon the base B of the vehicle hull W; rather, the base 1 is disposed at a prescribed distance or spacing relative to the base of the vehicle hull, with such spacing being disposed beyond the region of the base B that can buckle when a mine explodes. The base 1 is suspended on the front wall V and the roof plate D via a tubular construction. This tubular construction is provided with two guide tubes 3 that extend parallel to one another and upwardly at an angle relative to the base plane of the vehicle hull. The upper ends of the guide tubes 3 are secured in the upper region of the front wall V, and the lower ends of the guide tubes are suspended on the roof plate D via connecting tubes 3.1. The base 1 is displaceably disposed on the guide tubes 3 via holding means 1.1. Furthermore, a drive mechanism is provided for the movement of the base 1 upwardly and downwardly along the guide tubes 3. In the embodiment illustrated in FIG. 2, this drive mechanism is in the form of a spindle or worm drive 4 having an electrically driven threaded spindle that is driven by a motor 4.1.

By isolating or separating the seating unit from the base B of the vehicle hull W, a maximum degree of security is ensured for the driver. On the other hand, it is possible to provide not only a vertical and longitudinal adjustment relative to the operating components 5 and 6 illustrated in FIG. 2, but rather it is also possible to raise the base 1, together with the seat 2 and the backrest 2.1, into a raised position in which the driver's head is moved out of the opening of the hatch L to allow a direct view to the outside. In the event of danger, by actuating a rapid-lowering mechanism, the driver can again be rapidly returned to the interior of the vehicle hull.

Further exemplary embodiments of the seating unit will be explained subsequently.

Figure 2:
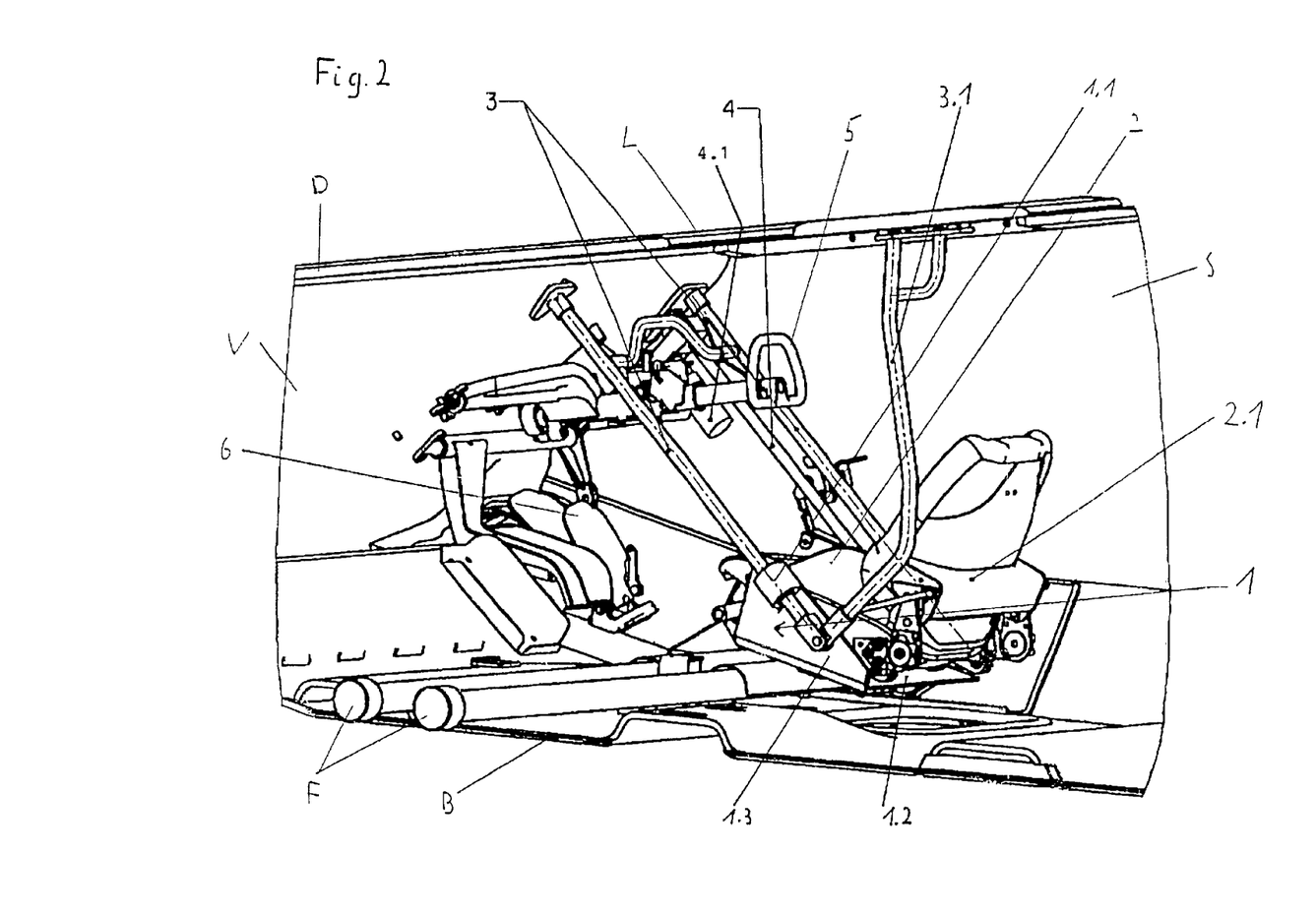
FIG. 2 is a perspective view of one exemplary embodiment of the inventive seating unit having a spindle drive in the combat vehicle of FIG. 1.
Figure 3:
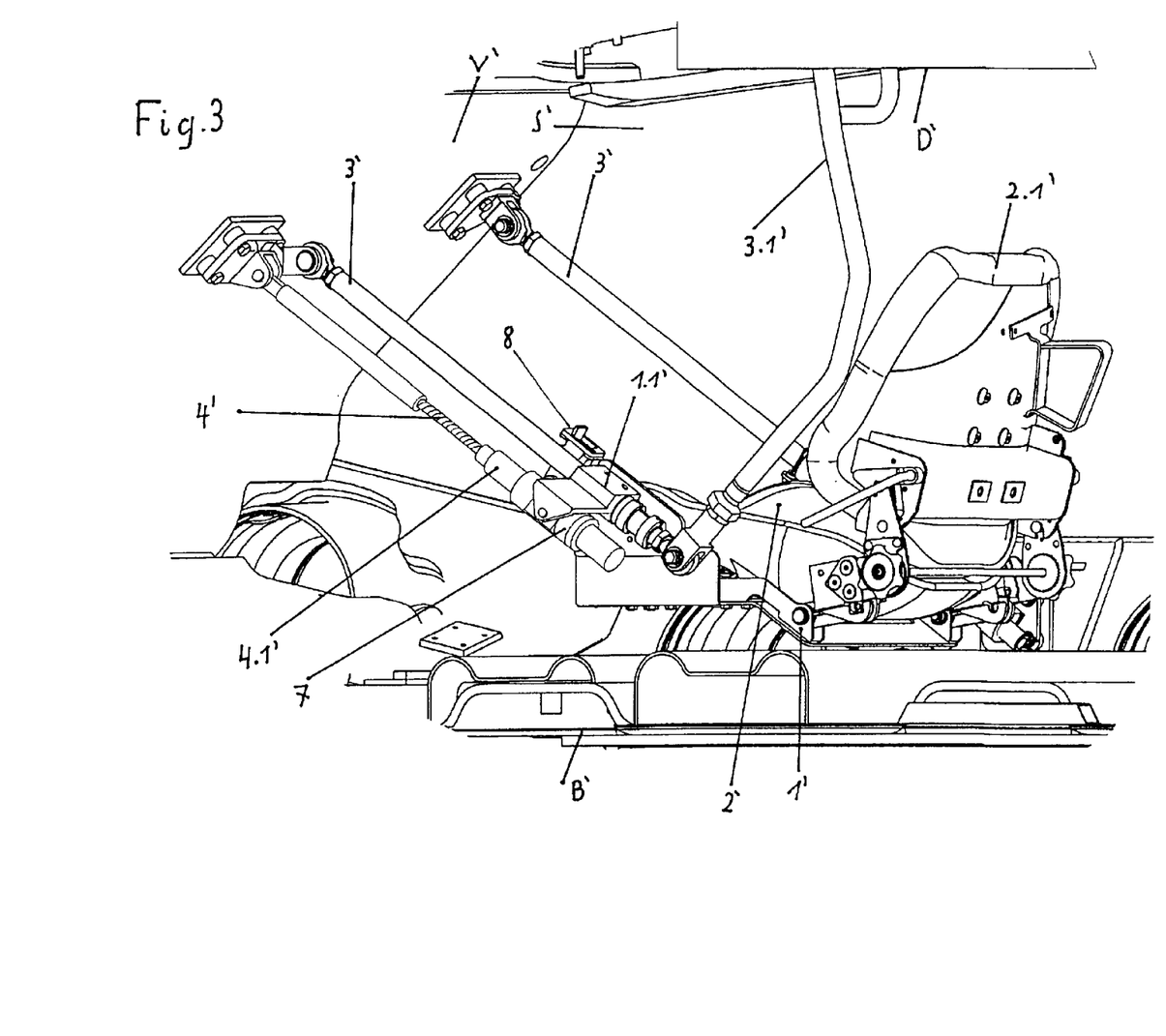
FIG. 3 is a view similar to that of FIG. 2 showing a variation of that embodiment.

FIG. 3 shows a variation of the seating unit of FIG. 2, and has a drive mechanism that is also embodied as a spindle drive. The same reference numerals are used in FIG. 3 as in FIG. 2, and are each provided with an apostrophe.

Thus, the seating unit has a base 1' that carries the seat 2' on which is disposed the back rest 2.1'. In the same manner as with the embodiment of FIG. 2, the base 1' is suspended on the front wall V' via guide tubes 3' that extend upwardly at an angle relative to the base plate B', whereby the lower end of the guide tubes 3' are again suspended on the roof plate D' via connecting tubes 3.1'. Extending parallel to the guide tubes 3' is a threaded spindle 4' that is driven by an electric motor 4.1' to which is secured the holding means 1.1' of the base 1'. For a rapid lowering of the base 1' from the upper position, the base 1' can be uncoupled from the spindle drive 4', 4.1' via a coupling 7. The electric motor 4.1', and a coupling 7 for the rapid lowering, can be actuated via a switch 8 by the person sitting upon the seat 2', so that the driver can be rapidly returned to the interior of the vehicle hull from the raised position in the event of danger.

Figure 4:
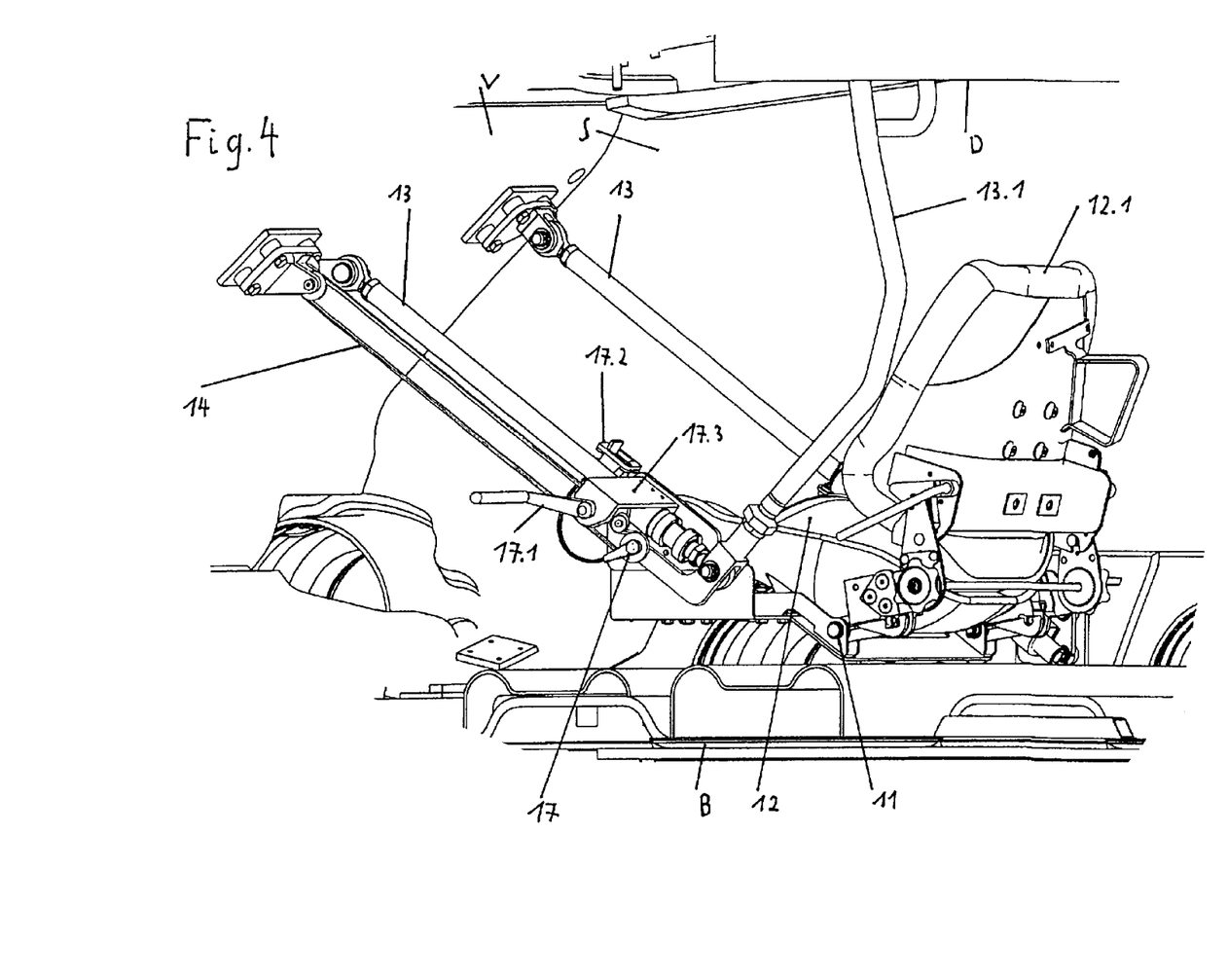
FIG. 4 shows a second exemplary embodiment of an inventive seating unit having a chain drive in the combat vehicle of FIG. 1.

The basic construction of the seating unit illustrated in FIG. 4 corresponds to that of the seating unit of FIGS. 2 and 3, and is merely provided with a different drive mechanism. Here also the base 11 carries a seat 12 and a backrest 12.1, and is guided via holding means 11.1 on the tubular construction that is comprised of the two guide tubes 13, the upper ends of which are secured to the front wall V, and the lower ends of which are suspended via connecting tubes 13.1 on the roof plate D. The drive mechanism for the base 11 is provided with a drive chain 14, to which the base 11 is secured, and a drive crank or handle 17.1 via which the drive chain 14 can be rotated. Furthermore, also with this embodiment there is disposed between the drive mechanism and the base 11 a release coupling 17 for the rapid lowering of the base 11, wherein the release coupling can be operated via an actuating device 17.2. To arrest the base 11, and hence the seat 12, in various height positions, there is provided a detent or latching mechanism 17.3 that is integrated into the drive mechanism.

Figure 5:
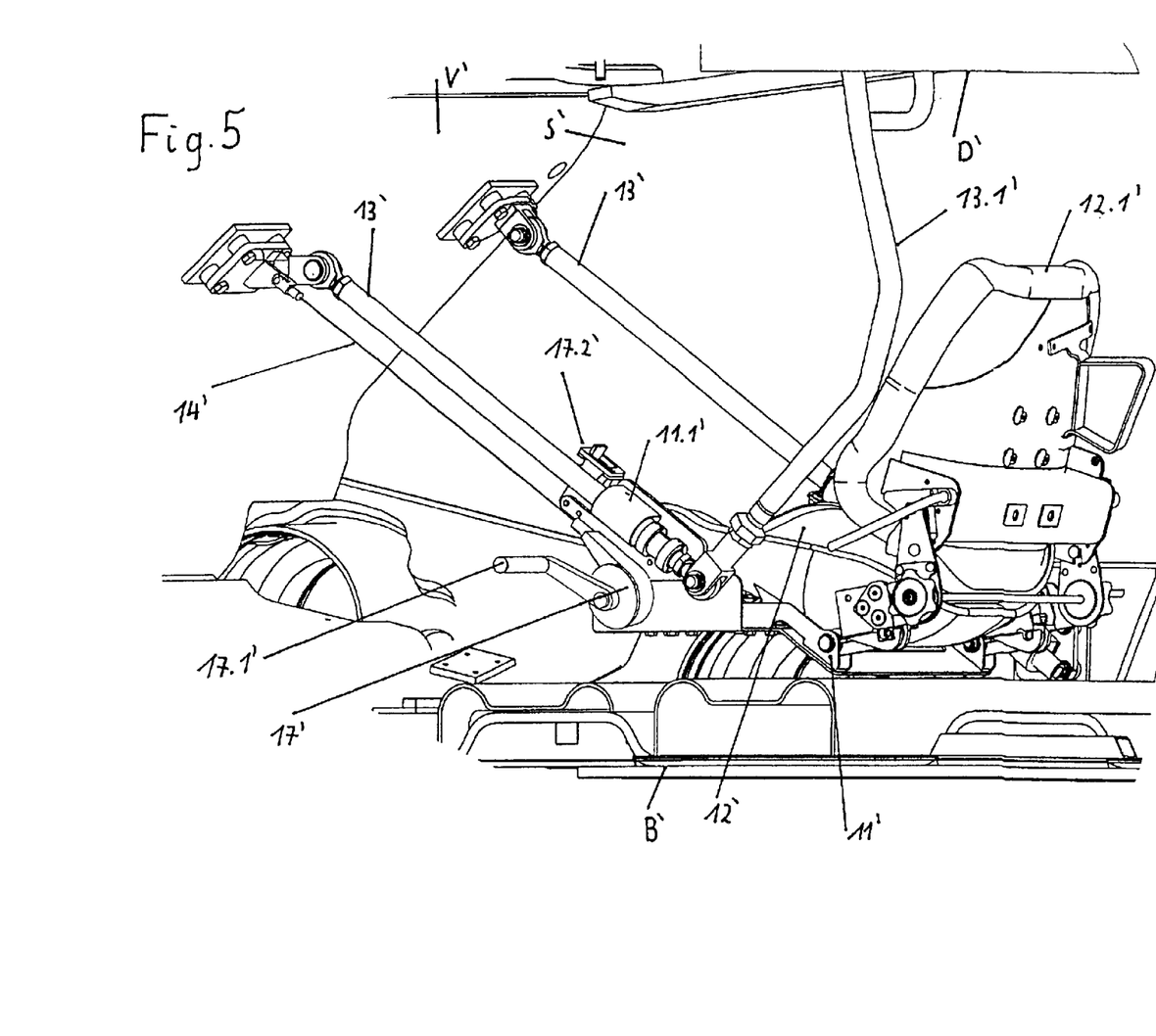
FIG. 5 is a view similar to that of FIG. 4 showing a variation of the embodiment thereof with a seating unit having a cable drive in the combat vehicle of FIG. 1.

With the variation of the embodiment of FIG. 4 illustrated in FIG. 5, instead of the chain drive the drive mechanism is in the form of a cable drive. In the embodiment of FIG. 5, the parts corresponding to those of FIG. 4 are designated with the same reference numerals and an apostrophe. Thus, the base 11' carries the seat 12' and the back rest 12.1', and is guided via holding means 11.1' on the guide tubes 13', the upper ends of which are secured to the front wall V', while the lower ends are suspended on the roof plate D' via connecting tubes 13.1'. The cable 14' extends parallel to the guide tubes 13', and that for a rapid lowering can be actuated via a crank drive 17' having a release coupling. The rapid lowering and arresting of the seat is effected via an actuating device 17.2'.

Figure 6:
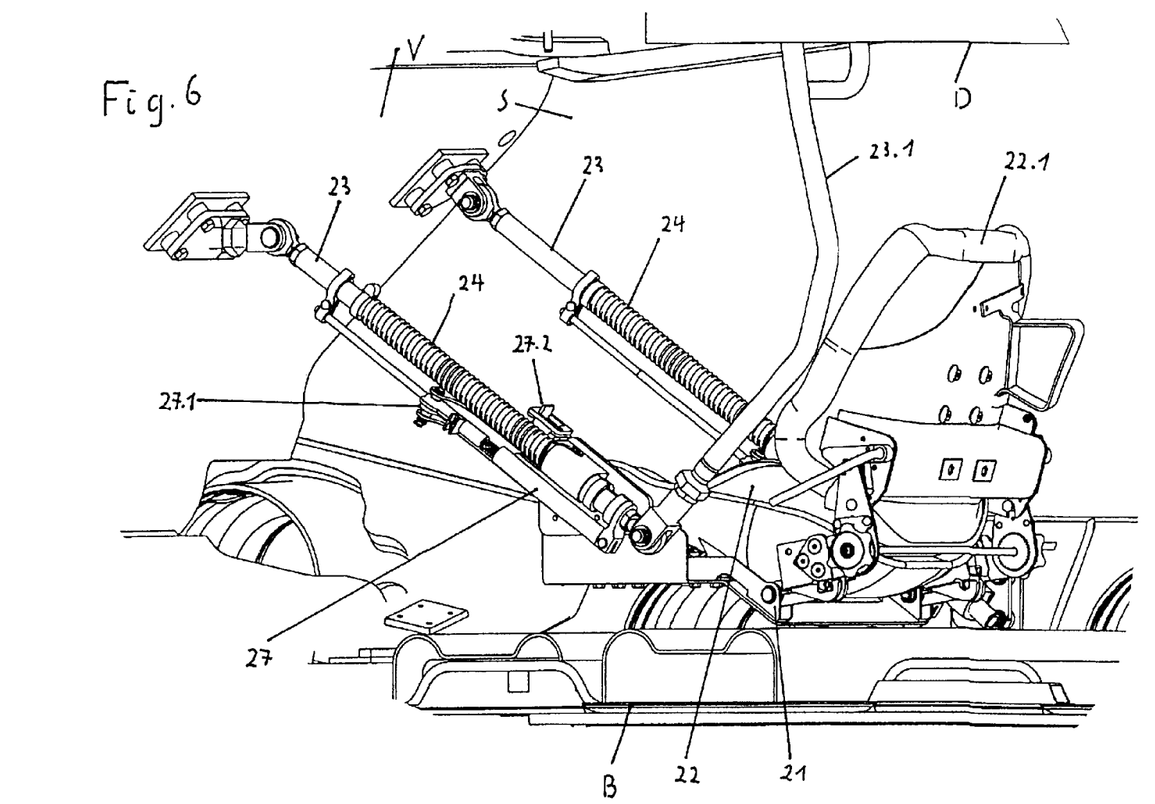
FIG. 6 is a view similar to that of FIGS. 2 to 5 of a third exemplary embodiment of an inventive seating unit having a coil spring drive in the combat vehicle of FIG. 1.

FIG. 6 shows an exemplary embodiment of a seating unit where the drive is embodied as a spring drive. The base 21 carries the seat 22 with the back rest 22.1, and is guided via holding means 21.1 on the guide tubes 23, which are surrounded by coil springs 24, which act as compensation springs that maintain the actual weight of the base 21 together with the seat 22 in balance. The actual spring drive 27 extends parallel to the guide tubes 23, and is provided with a compression spring that is disposed in the illustrated cylinder and that upon actuation presses the base 21 with the seat 22 upwardly. The spring drive 27 is also provided with a device for arresting the seat and for the rapid lowering of the seat. The actuating device 27.2 for arresting the seat and for the rapid lowering can be reached by the person seated upon the seat 22.

Figure 7:
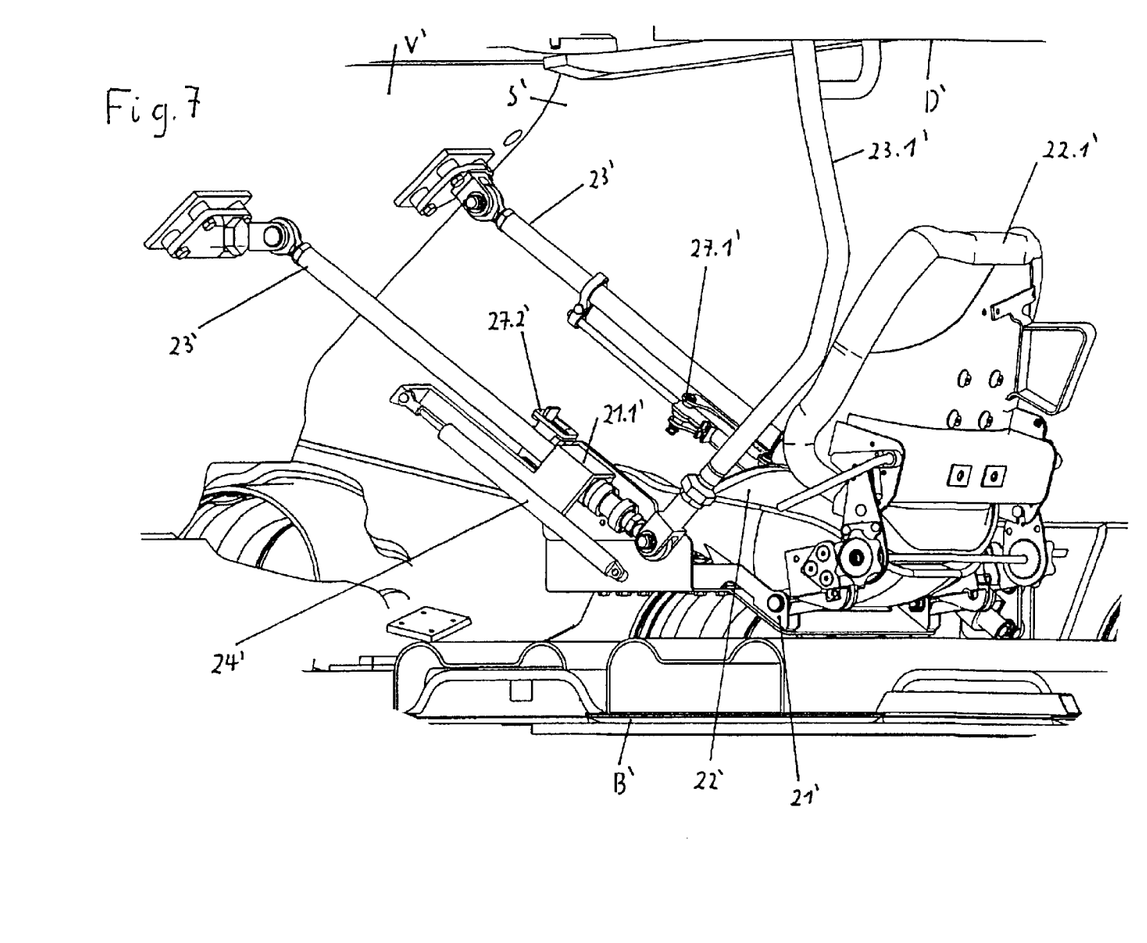
FIG. 7 is a view similar to that of FIG. 6 of a variation of the embodiment thereof having a seating unit with pneumatic spring drive in the combat vehicle of FIG. 1.

A variation of this seating unit with spring drive is shown in FIG. 7, where the same reference numerals as in FIG. 6 are used and are provided with an apostrophe.

In this embodiment, the drive of the base 21', which carries the seat 22' with the back rest 22.1', and which is guided on the guide tubes 23' via a holding means 21.1', is effected by a pneumatic spring drive 24', which in a non-separately illustrated manner also contains a device for the rapid lowering of the seat. Furthermore provided are a device 27.1' for arresting the seat and a device 27.2' for actuating the rapid lowering and the arresting of the seat. The upper ends of the guide tubes 23' are secured to the front wall V', while the lower ends of the guide tubes 23' are suspended on the roof plate D' via the connecting tubes 23.1'.

The specification incorporates by reference the disclosure of German priority document 101 45 315.9 filed Sep. 14, 2001.

The present invention is, of course, in no way restricted to the specific disclosure of the specification and drawings, but also encompasses any modifications within the scope of the appended claims.

We claim:

1. A seating unit in a combat vehicle that is protected against mines and has a vehicle hull disposed on a chassis, wherein said hull has a roof plate provided with at least one hatch that can be closed off by a hatch cover, and wherein the seating unit is disposed in the vehicle hull in the region below said hatch, said seating unit comprising:

a base;

a seat disposed on said base;

a back rest pivotably secured to said base; and a tubular construction, wherein said base is suspended on at least one of a front wall, a side wall and said roof plate of said vehicle hull via said tubular construction in such a way that said base is not at less than a prescribed spacing relative to a base plate of said hull, wherein said tubular construction comprises at least two guide tubes, which extend parallel to one another and upwardly at an angle relative to a plane of said base plate of said vehicle hull, wherein upper ends of said guide tubes are secured to an upper region of said front or side wall of said hull, wherein lower ends of said guide tubes are suspended on said roof plate on said hull via connecting tubes, wherein holding means are provided for displaceably disposing said base on said guide tubes, and wherein a drive mechanism is provided for effecting a back and forth movement of said base along said guide tubes.

2. A seating unit according to claim 1, wherein said base is embodied as a deformation-resistant splinter proof sheet-metal structure having a base wall and two closed side walls.

3. A seating unit according to claim 1, wherein said guide tubes are disposed in such a way that said base and seat, in a prescribed raised position, are disposed directly below an opening of said at least one hatch.

4. A seating unit according to claim 1, wherein said drive mechanism for movement of said base is embodied as a spindle drive having an electrically driven threaded spindle.

5. A seating unit according to claim 1, wherein said drive mechanism for movement of said base is embodied as a cable drive or a chain drive.

6. A seating unit according to claim 1, wherein said drive mechanism for movement of said base is provided with compression or tension springs that can be pre-tensioned, arrested and released.

7. A seating unit according to claim 1, wherein said drive mechanism for movement of said base is provided with at least one pneumatic spring.

8. A seating unit according to claim 1, wherein said drive mechanism for movement of said base is provided with a device for effecting a rapid lowering of said base.

* * * * *